United States Patent
Kawamura et al.

(10) Patent No.: US 10,454,110 B2
(45) Date of Patent: Oct. 22, 2019

(54) METHOD FOR PRODUCING LITHIUM ION CELL ACTIVE MATERIAL PARTICLES

(71) Applicant: TORAY INDUSTRIES, INC., Tokyo (JP)

(72) Inventors: Hiroaki Kawamura, Shiga (JP); Miyuki Tabayashi, Shiga (JP); Yasuo Kubota, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 387 days.

(21) Appl. No.: 15/317,567

(22) PCT Filed: Jun. 1, 2015

(86) PCT No.: PCT/JP2015/065744
§ 371 (c)(1),
(2) Date: Dec. 9, 2016

(87) PCT Pub. No.: WO2015/190334
PCT Pub. Date: Dec. 17, 2015

(65) Prior Publication Data
US 2017/0125812 A1     May 4, 2017

(30) Foreign Application Priority Data

Jun. 11, 2014 (JP) ................................ 2014-120185

(51) Int. Cl.
| | | |
|---|---|---|
| *C01B 15/16* | (2006.01) | |
| *C01B 25/26* | (2006.01) | |
| *H01M 4/58* | (2010.01) | |
| *C01B 25/45* | (2006.01) | |
| *C01G 53/00* | (2006.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ........... *H01M 4/5825* (2013.01); *C01B 25/45* (2013.01); *C01G 53/00* (2013.01); *C01G 53/50* (2013.01); *H01M 4/505* (2013.01); *H01M 4/525* (2013.01); *H01M 10/0525* (2013.01); *C01P 2006/40* (2013.01); *H01M 2004/028* (2013.01)

(58) Field of Classification Search
CPC ........... H01M 4/5825; H01M 10/0525; H01M 4/525; H01M 4/505; H01M 2004/028; C01G 53/50; C01G 53/00; C01B 25/45; C01P 2006/40
USPC ........................................................ 423/306
See application file for complete search history.

(56) References Cited

U.S. PATENT DOCUMENTS

| | | | |
|---|---|---|---|
| 8,460,573 B2 | 6/2013 | Nakano et al. | |
| 8,895,190 B2 | 11/2014 | Chang et al. | |
| 2009/0186153 A1 | 7/2009 | Hertz et al. | |
| 2010/0227221 A1 | 9/2010 | Chang et al. | |
| 2011/0037019 A1 | 2/2011 | Nakano et al. | |
| 2014/0105811 A1 | 4/2014 | Zhu et al. | |

FOREIGN PATENT DOCUMENTS

| | | |
|---|---|---|
| CN | 103094549 A | 5/2013 |
| JP | 2009-526735 A | 7/2009 |
| JP | 2009-537301 A1 | 10/2009 |
| JP | 2012-167314 A | 9/2012 |
| JP | 2013-107815 A | 6/2013 |
| KR | 10-2012-0003630 A | 1/2012 |
| KR | 20120003630 A * | 1/2012 |
| KR | 10-1210495 B1 | 12/2012 |
| TW | 200736165 A | 10/2007 |
| WO | WO 2009/131095 A1 | 10/2009 |

OTHER PUBLICATIONS

Machine translation of KR-20120003630-A (Year: 2012).*
Qin et al. "Morphology controlled synthesis and modification of high-performance LiMnPO4 cathode materials for Li-ion batteries" J. Mater. Chem., 2012, 22, 21144-21153. (Year: 2012).*
Devaraju et al., "Controlled synthesis of plate-like LiCoPO4 nanoparticles via supercritical method and their electrode property", Electrochimica Acta, vol. 85, (2012), p. 548-553.
International Search Report, issued in PCT/JP2015/065744, PCT/ISA/210, dated Sep. 1, 2015.
Written Opinion of the International Searching Authority, issued in PCT/JP2015/065744, PCT/ISA/237, dated Sep. 1, 2015.
Aimable et al., "Characteristics of LiFePO4 obtained through a one step continuous hydrothermal synthesis process working in supercritical water," Solid State Ionics, vol. 180, Jun. 22, 2009, pp. 861-866.
Extended European Search Report issued in European Application No. 15806223.2 dated Nov. 28, 2017.

* cited by examiner

*Primary Examiner* — Haytham Soliman
(74) *Attorney, Agent, or Firm* — Birch, Stewart, Kolasch & Birch, LLP

(57) ABSTRACT

A method for producing an active material particle for a lithium ion battery, the method including steps of: flowing a plurality of raw material solutions into respective raw material-feeding channels under a pressure of 0.3 to 500 MPa, the solutions being capable of inducing a chemical reaction when mixed, thereby producing an active material particle for a lithium ion battery or an active material precursor particle for a lithium ion battery; and mixing the plurality of raw material solutions at a junction of the raw material-feeding channels to induce the chemical reaction, thereby continuously producing an active material particle for a lithium ion battery or producing an active material precursor particle for a lithium ion battery.

6 Claims, No Drawings

METHOD FOR PRODUCING LITHIUM ION CELL ACTIVE MATERIAL PARTICLES

TECHNICAL FIELD

The present invention relates to a production method for continuously producing an active material particle for a lithium ion battery.

BACKGROUND ART

It is known that charging/discharging a lithium ion battery involves movement of electrons and lithium ions in the battery and the charge/discharge characteristics of the battery can be enhanced by increasing the moving speed. Since movement of electrons and lithium ions is most disturbed when they move inside an active material particle, the charge/discharge characteristics can therefore be effectively enhanced by reducing the particle diameter of the active material particle to a nanoparticle size so as to decrease the moving distance of electrons and lithium ions in the particle and increasing crystallinity of the active material particle so that electrons and lithium ions can smoothly move in the particle.

The technique for nanoparticulation of the active material particle includes a breakdown-type technique of obtaining a nanoparticle by crushing an active material particle having a particle diameter on the micrometer order, and a buildup-type technique of directly producing an active material nanoparticle from the raw material. The breakdown type is a method of crushing a moderately large active material by using a media dispersion such as ball mill and bead mill and is advantageous in that the method is easily adopted to any materials, but on the other hand, is disadvantageous in that a problem of contamination with media debris is likely to occur in the process of crushing or a long time treatment is required so as to obtain a nanopartilce having a particle diameter of less than 100 nm.

Accordingly, a nanoparticulation technique of buildup type is being studied these days. Many of buildup-type methods are a technique of synthesizing a nanoparticle in a liquid phase and, specifically, a method of dissolving or dispersing the raw material in a solvent and heating the solution or dispersion while stirring to produce an active material nanoparticle.

The method for increasing crystallinity of the active material particle includes a method of heating/annealing the particle, but when a nanoparticle is annealed, it is likely that the particles grow by sintering to each other and the particle diameter becomes large. Accordingly, a method of synthesizing a particle in a pressurized state to obtain a particle with high crystallinity immediately after the synthesis has been proposed.

The method disclosed in Patent Document 1 is a method called hydrothermal synthesis, where the raw material is dissolved in water and the resulting solution is sealed in a pressure-resistant vessel and heated to produce a nanoparticulated active material of a lithium ion secondary battery.

The method disclosed in Non-Patent Document 1 is a synthesis method called supercritical synthesis, where a solution prepared by dissolving the raw material is brought into a high-temperature/high-pressure supercritical state to produce a nanoparticulated active material for a lithium ion battery. In the methods of Patent Document 1 and Non-Patent Document 1, the reaction system during synthesis is exposed to high pressure and therefore, the particle obtained tends to have high crystallinity and to be reduced in the particle diameter.

BACKGROUND ART DOCUMENT

Patent Document
Patent Document 1: WO 2009/131095
Non-Patent Document
Non-Patent Document 1: Electrochimica Acta, 85 (2012), 548

SUMMARY OF THE INVENTION

Problems that the Invention is to Solve

An active material for a lithium ion battery may be nanoparticulated by using the method of Patent Document 1, but a huge pressure-resistant/heat-resistant vessel is necessary for mass production and moreover, due to batch production, it is difficult to produce the particle in a continuous manner.

In the method of Non-Patent Document 1, the synthesis is performed in a supercritical state and therefore, upsizing of apparatus or mass production is difficult.

An object of the present invention is to provide a method for producing a high-crystallinity nanoparticulate active material for a lithium ion battery in a simple and highly efficient manner.

Means for Solving the Problems

In order to solve the above-described problem, the present invention relates to a method for producing an active material particle for a lithium ion battery, the method including steps of: flowing a plurality of raw material solutions into respective raw material-feeding channels under a pressure of 0.3 to 500 MPa, the solutions being capable of inducing a chemical reaction when mixed, thereby producing an active material particle for a lithium ion battery or an active material precursor particle for a lithium ion battery; and mixing the plurality of raw material solutions at a junction of the raw material-feeding channels to induce the chemical reaction, thereby continuously producing an active material particle for a lithium ion battery or producing an active material precursor particle for a lithium ion battery.

Advantage of the Invention

According to the production method of the present invention, an active material for a lithium ion battery, having a nanometer-order particle diameter and high crystallinity, can be produced in a simple and highly efficient manner.

Mode for Carrying Out the Invention

In the production method of the present invention, first, a plurality of raw material solutions are prepared. Here, the raw material solution is obtained by dissolving, in a solvent, a raw material for producing the nanoparticle and indicates a solution capable of producing an active material particle for a lithium ion battery or an active material precursor particle for a lithium ion battery by inducing a chemical reaction when the plurality of solutions are mixed.

The active material for a lithium ion battery produced by the production method of the present invention may be either a cathode active material or an anode active material.

Examples of the cathode active material include $LiMPO_4$, $Li_2MSiO_4$, and $Li_2MPO_4F$ (M is one or more members selected from Fe, Co, Mn and Ni), in addition to $LiMn_2O_4$ that is called a spinel type.

The plurality of raw material solutions capable of producing an active material particle for a lithium ion battery by inducing a chemical reaction when mixed preferably includes a first raw material solution containing a lithium compound and a second raw material solution containing a transition metal. Among the elements constituting the cathode active material, a raw material compound other than lithium and transition metal may be added to either raw material solution of the first raw material solution and the second raw material solution or may not be added to either solution but be added to a third raw material solution or a fourth raw material solution. In the case of producing an active material containing two or more kinds of transition metal elements, third and fourth raw material solutions may be prepared as separate raw material solutions for respective transition metal elements. However, in order to prevent clogging of a channel, in the case of dissolving a plurality of raw material compounds in one raw material solution, it is preferable to avoid a combination causing a precipitation reaction. As for oxygen, dissolved oxygen contained in the solvent may be used, and oxygen may not be added as a raw material.

As for the transition metal contained in the raw material solution, a salt is preferably used so as to dissolve the transition metal in a solvent. Taking into account the solubility in water or an organic solvent, it is more preferable to use a carbonate, a phosphate, a sulfate, a hydrochloride, a nitrate, an acetate or an acetylacetonate, and in particular, taking into account the solubility in water that is a general-purpose solvent, use of a sulfate, a nitrate or an acetate is preferred.

As for the lithium compound, taking into account the solubility in water or an organic solvent, a salt is preferably used. In particular, lithium carbonate or lithium hydroxide is preferred, and taking into account the solubility in water that is a general-purpose solvent, it is more preferable to use lithium hydroxide.

Specifically, in the case of $LiMn_2O_4$, a combination of a first raw material solution having dissolved therein a Li salt and a second raw material solution having dissolved therein a Mn salt is preferably used. In the case of $LiMPO_4$, a combination of a first raw material solution having dissolved therein a Li salt and a second raw material solution having dissolved therein an M salt and a phosphate compound, or a combination of three solutions, i.e., a first raw material solution having dissolved therein a Li salt, a second raw material solution having dissolved therein an M salt, and a third raw material solution having dissolved therein a phosphate compound, may be used. Here, if a Li salt and a phosphate compound are mixed, a precipitation reaction readily occurs, and it is therefore preferable to avoid a combination of a raw material solution having dissolved therein a Li salt and a phosphate compound and a raw material solution having dissolved therein an M salt.

In the case of $Li_2MSiO_4$, as well as a combination of three solutions, i.e., a first raw material solution having dissolved therein a Li salt, a second raw material solution having dissolved therein an M salt, and a third raw material solution having dissolved therein a Si compound, two solutions may be combined by mixing the raw materials to an extent not causing precipitation. In the case of $Li_2MPO_4F$, as well as a combination of four solutions, i.e., a first raw material solution having dissolved therein a Li salt, a second raw material solution having dissolved therein an M salt, a third raw material solution having dissolved therein a phosphate compound, and a fourth raw material solution having dissolved therein a fluorine compound, three solutions or two solutions may be combined by mixing the raw materials to an extent not causing precipitation.

The active material precursor particle for a lithium ion battery is a compound particle containing at least partially an element contained in the finally obtained active material for a lithium ion battery and indicates a particle capable of converting to an active material for a lithium ion battery by a certain additional treatment.

In the production of a cathode active material, the precursor particle is preferably a compound particle containing, among elements contained in the finally obtained active material, all elements except for lithium and oxygen. More specifically, a particle of a transition metal salt is preferred. Examples of the particle of a transition metal salt include a hydroxide particle, a carbonate particle, and an acetylacetonate particle, each containing one transition metal element selected from the group consisting of nickel, manganese, cobalt and aluminum, and also include a composite hydroxide particle, a composite carbonate particle, and a composite acetylacetonate particle, each containing two or more transition metal elements selected from the group described above. Such a precursor particle is mixed with a lithium source, e.g., a lithium compound such as lithium hydroxide and lithium carbonate, and fired, whereby a cathode active material particle for a lithium ion battery, such as $LiCo_xNi_yO_2$ (in which x+y=1), $Li(Ni_xCo_yAl_z)O_2$ (in which x+y+z=1), $Li(Ni_xMn_yCo_z)O_2$ (in which x+y+z=1), which are called a layered rock salt type, and $Li_2MnO_3$—$Li(Ni_xMn_yCo_z)O_2$ (in which x+y+z=1), which is called a lithium excess type, can be obtained.

As the raw material solution capable of producing an active material precursor particle for a lithium ion battery, a combination of a first raw material solution containing a transition metal and a second raw material solution containing an element contained in the precursor material, excluding a transition metal, is preferably used. In the case of preparing a transition metal salt particle as the precursor particle, it is preferable to use a plurality of raw material solutions including a first raw material solution containing a transition metal and a second raw material solution containing a counter ion forming a salt with the transition metal contained in the first raw material solution. In this case, as for the transition metal contained in the first raw material solution, a salt is preferably used so as to dissolve the transition metal in a solvent. Taking into account the solubility in water or an organic solvent, it is more preferable to use a carbonate, a phosphate, a sulfate, a hydrochloride, a nitrate, an acetate or an acetylacetonate, and in particular, taking into account the solubility in water that is a general-purpose solvent, use of a sulfate, a nitrate or an acetate is preferred.

Specifically, in the case of a (composite) hydroxide nanoparticle $M(OH)_2$ (in which M is $(Ni_xCo_yAl_z)$ or $(Ni_xMn_yCo_z)$ and in both, x+y+z=1), a combination of one or more raw material solutions each having dissolved therein a transition metal and a raw material solution having dissolved therein a hydroxide ion-containing compound may be used. In the case of a (composite) carbonate nanoparticle $MCO_3$ (in which M is $(Ni_xCo_yAl_z)$ or $(Ni_xMn_yCo_z)$ and in both, x+y+z=1), a combination of one or more raw material solutions each having dissolved therein a transition metal and a raw material solution having dissolved therein a carbonate-containing compound may be used. In the case of a (composite) acetylacetonate nanoparticle $M(C_5H_7O_2)_2$ (in which M is $(Ni_xCo_yAl_z)$ or $(Ni_xMn_yCo_z)$ and in both, $x+y+z=1$), a combination of one or more raw material solutions each having dissolved therein a transition metal and a raw material solution having dissolved therein an acetylacetonate-containing compound may be used.

The solvent of the raw material solution is appropriately selected in consideration of the solubility of the raw material. The solvent may be one kind of a solvent or may be a mixed solvent of two or more kinds of solvents. In addition, when a coordinating solvent having an ability to coordinate to a particle is selected, an effect of reducing the particle diameter of a particle after the synthesis may be expected, and it is therefore preferable to at least partially use a coordinating solvent.

Among coordinating solvents, examples of the preferable solvent include an alcohol-based solvent and specifically include ethylene glycol, diethylene glycol, triethylene glycol, tetraethylene glycol, 2-propanol, 1,3-propanediol, and 1,4-butanediol. An amine-based solvent can also be used as a preferable coordinating solvent, and examples thereof include a linear, branched or cyclic saturated aliphatic primary, secondary or tertiary amine, such as hexylamine, heptylamine, octylamine, nonylamine, decanamine, dioctylamine, trioctylamine and piperazine, and a linear, branched or cyclic unsaturated aliphatic primary, secondary or tertiary amine, such as oleylamine, linoleylamine and linolenylamine.

Examples of other coordinating solvents that can be suitably used include a linear, branched or cyclic saturated monocarboxylic acid, such as butyric acid, valeric acid, caproic acid, enanthic acid, caprylic acid, pelargonic acid, capric acid, undecanoic acid and lauric acid, and a linear, branched or cyclic unsaturated monocarboxylic acid, such as heptenoic acid, myristoleic acid, palmitoleic acid, oleic acid, linoleic acid, α-linolenic acid, γ-linolenic acid, elaidic acid, vaccenic acid, gadoleic acid, eicosenoic acid, erucic acid, nervonic acid, eicosapentaenoic acid and docosahexaenoic acid.

The solvents used in the plurality of raw material solutions may be different from each other or may be the same, but in the case of using different solvents, a combination of compatible solvents is preferred. The compatibilization of solvents is expected to make it possible to uniformly mix the raw materials at the time of mixing and produce a nanoparticle containing less impurity and having a uniform composition.

In the production method of the present invention, a plurality of raw material solutions are mixed in a pressurized state and after the mixing, the mixed solution is usually discharged along with reduction in the pressure. Accordingly, unlike the synthesis utilizing a flask, etc., it is difficult to take time and wait until completion of a particle production reaction by letting the raw material solutions after mixing be held in a pressurized state. For this reason, in the production method of the present invention, the chemical reaction preferably includes a reaction mechanism of producing a particle immediately after mixing of raw material solutions, specifically, a neutralization reaction is preferably included in the reaction for producing an active material particle or an active material precursor particle. It is therefore preferred that the pH of at least one raw material solution is set to be 5 or less and the pH of at least another raw material solution is set to be 9 or more.

In the production method of the present invention, a plurality of raw material solutions can be joined in a fixed ratio and the pH after joining is therefore likely to become constant, so that the method can be suitably applied in particular to the synthesis of an active material particle, in which the pH must be continuously maintained according to the progress of reaction. For example, in order to produce a composite carbonate particle as a precursor of $Li(Mn_{1/3}Ni_{1/3}Co_{1/3})O_2$, conventionally, $Na_2CO_3$ is added dropwise to an aqueous solution of sulfates of Ni, Mn and Co and at the time of dropwise addition, ammonia water is appropriately added to maintain the pH of the solution at 7, but a certain time is required until the pH is stabilized. In the production method of the present invention, ammonia water is previously added to $Na_2CO_3$, and the carbonate is reacted with an aqueous solution of sulfates at the junction point of channels, so that the pH of the mixed solution after reaction can be immediately stabilized.

In the production method of the present invention, the above-described plurality of raw material solutions are flowed into respective raw material-feeding channels, and an active material particle for a lithium ion battery or an active material precursor particle for a lithium ion battery is continuously produced by a chemical reaction at the junction of those raw material-feeding channels.

In order to be joined under pressure, the raw material solutions are preferably joined by feeding each raw material solution to the respective channels using a plunger pump. The number of plunger pumps and channels may be sufficient if it is a minimum number of raw material solutions, but in this case, due to the nature of a plunger pump, the raw material is intermittently fed to the junction point, and a time to allow residence of the raw material is produced at the junction point. Accordingly, it is more preferable for more stable production to establish a configuration where each raw material solution is flowed into two raw material-feeding channels to provide a non-pulsing operation of uninterruptedly feeding the raw material solution.

The channel diameter immediately before the junction of raw material-feeding channels is preferably 3 mm or less, more preferably 0.5 mm or less, so as to limit the contact area of raw materials with each other at the junction point and achieve uniform reaction of raw materials. In addition, for suppressing a pressure loss of the raw material flowing in the channel, the channel diameter is preferably 0.05 mm or more, more preferably 0.1 mm or more.

In order for the produced particle to have a sufficiently small particle diameter and a sufficiently high crystallinity, the pressure at the time of joining is set to be from 0.3 to 500 MPa. As the pressure is higher, the processing time can be shorter, and the pressure at the time of joining is therefore preferably 1 MPa or more, 10 MPa or more. If the pressure is too high, the temperature of the solution after joining greatly rises, leaving the possibility that bumping of the solvent occurs or a side reaction proceeds, and the pressure is therefore preferably 250 MPa or less.

At the junction of raw material-feeding channels, the raw material solutions are preferably well mixed so as to achieve uniform reaction of the raw material solutions. For this purpose, near the junction of the raw material-feeding channels, a turbulent flow is preferably imparted to the raw material solutions after joining. The method for imparting a turbulent flow is not particularly limited but includes a method where, for example, a single channel resulting from joining is bent to a right angle immediately after joining or a stirring plate is provided at the junction.

In the case where three or more kinds of raw material solutions are used, the raw material solutions may be joined in block at one place and reacted at a time or may be joined at two or more places and reacted in multiple stages.

In the production apparatus for carrying out the production method of the present invention, a wet jet mill is suitably used. Examples of such a wet jet mill include JN Series (manufactured by Jokoh Co., Ltd.), Star Burst (registered trademark) Series manufactured by Sugino Machine Limited, and NanoVater (registered trademark) Series (manufactured by Yoshida Kikai Co., Ltd.), and in particular, NanoVater combined with a microreactor (manufactured by Yoshida Kikai Co., Ltd.) for NanoVater is suitably used.

The raw material solutions are preferably temperature-adjusted before mixing (joining) such that a temperature not less than the temperature necessary for a chemical reaction of producing an active material particle for a lithium ion battery or an active material precursor particle for a lithium ion battery is achieved at the junction of the raw material-feeding channels. When the raw material solutions are temperature-adjusted before mixing, a particle production reaction immediately proceeds at the time of joining, and a particle having a high crystallinity and a small particle diameter can be obtained. In addition, production of a product other than the object material due to the solution temperature which has not reached the reaction temperature can be prevented. This temperature adjustment is effective particularly when producing an olivine-type active material, i.e., $LiMPO_4$ (M is one or more members selected from Fe, Co, Mn and Ni), which is susceptible to a side reaction unless it has reached the reaction temperature. Specifically, the temperature adjustment is preferably performed such that the temperature after joining of raw material solutions becomes from 60 to 120° C., more preferably from 80 to 110° C.

Such temperature adjustment may be previously performed before flowing the raw material solutions into the raw material-feeding channels, but in order to prevent denaturation of the raw material, it is more preferable to perform the temperature adjustment prior to the junction of raw material-feeding channels.

In the production method of the present invention, since two or more kinds of raw material solutions are joined in a fixed ratio and nanoparticles are continuously produced, the method is suitable as a system replacing the conventional system of synthesizing a nanoparticle by heating/stirring one raw material solution in a flask and continuously adding dropwise another raw material solution thereto.

According to the production method of the present invention, an active material particle with high crystallinity for a lithium ion battery can be produced. The level of crystallinity of the active material particle is evaluated by the magnitude of crystallite size relative to the particle diameter and as the magnitude of crystallite size (nm)/average particle diameter (nm) is closer to 1, the crystallinity is higher.

EXAMPLES

The present invention is described specifically below by referring to Examples, but the present invention is not limited only to these Examples.

A. Calculation of Average Particle Diameter of Active Material Particle for Lithium Ion Battery Particles were observed using a scanning electron microscope (S-5500, manufactured by Hitachi High-Technologies Corporation) at such a magnification that from 30 to 60 particles are included in one visual field, and an average of particle diameters of all particles in the visual field was taken as the average particle diameter. The particle diameter of each particle was an average of the maximum diameter and the minimum diameter of the particle.

B. Identification of Crystal Phase of Active Material Particle for Lithium Ion Battery The identification was performed by measuring the particle by use of an X-ray diffraction apparatus, D8 ADVANCE, manufactured by Bruker AXS K.K. under the conditions of 2θ=from 5 to 70°, a step angle of 0.040°, and a step time of 70.4 seconds. The calculation of the crystallite size was performed using a Rietveld analysis software, TOPAS, attached to D8 ADVANCE.

C. Evaluation of Charge/Discharge Characteristics

900 Parts by weight of an active material particle, 50 parts by weight of acetylene black (DENKA BLACK (registered trademark) produced by Denki Kagaku Kogyo K.K.) as a conductive assistant, 50 parts by weight of polyvinylidene fluoride (Kynar HSV-900, produced by ARKEMA K.K.) as a binder, and 1,200 parts by weight of N-methylpyrrolidone as a solvent were mixed by a planetary mixer to obtain an electrode paste. The electrode paste was applied onto an aluminum foil (thickness: 18 μm) by using a doctor blade (300 μm) and dried at 80° C. for 30 minutes to obtain an electrode plate. The electrode plate manufactured was cut into a size of 15.9 mm in diameter and used as a positive electrode, a lithium foil cut out into a size of 16.1 mm in diameter and 0.2 mm in thickness was used as a negative electrode, Celgard (registered trademark) #2400 (produced by Celgard Inc.) cut out into a size of 20 mm in diameter was used as a separator, a solvent composed of 1 M $LiPF_6$-containing ethylene carbonate:diethylene carbonate=3:7 (by volume) was used as an electrolytic solution, and a 2032 type coin battery constituted from these components was manufactured and subjected to electrochemical evaluations. In the measurement, charge/discharge measurement was performed three times at a rate of 0.1 C and successively performed three times at 3 C, and the third discharge capacity at each rate was taken as the discharge capacity.

Example 1

Production of $Li(Ni_{1/3}Mn_{1/3}Co_{1/3})O_2$

A first raw material solution was prepared by dissolving 1.69 g of manganese sulfate monohydrate, 2.81 g of cobalt sulfate heptahydrate and 2.63 g of nickel sulfate hexahydrate in 100 g of pure water. A second raw material solution was prepared by dissolving 3.18 g of sodium carbonate in 100 g of pure water, and 0.8 g of 28% ammonia water was added to the second raw material solution so that when two raw material solutions are mixed, the pH of the mixed solution can become 8. In NanoVater L-ED (manufactured by Yoshida Kikai Co., Ltd.) having a channel diameter of about 200 μm and equipped with a microreactor having a turbulent flow mechanism of bending the channel to a right angle at the junction point, the first raw material solution and the second raw material solution were flowed into inner channels of the microreactor and mixed in a ratio of 1:1 under a pressure of 20 MPa at the junction of inner channels of the microreactor to obtain a $(Mn_{1/3}Ni_{1/3}Co_{1/3})CO_3$ particle as the solid component. The average particle diameter was calculated and found to be 132.2 nm. The obtained nanoparticle was mixed with 1.28 g of lithium hydroxide monohydrate and fired at 800° C. in an air atmosphere to obtain $Li(Ni_{1/3}Mn_{1/3}Co_{1/3})O_2$ having an average particle diameter of 252.3 nm, a crystallite size of 201.2 nm, and a crystallite size of 0.80 relative to the average particle diameter. The charge/discharge characteristics of the obtained $Li(Ni_{1/3}Mn_{1/3}Co_{1/3})O_2$ were evaluated according to C described above assuming a theoretical capacity of 160 mAh/g, as a result, the discharge capacity was 145 mAh/g at 0.1 C and 135 mAh/g at 3 C.

Example 2

Production of Lithium Iron Phosphate:

A first raw material solution was prepared by dissolving 2.52 g of lithium hydroxide monohydrate in 15 g of pure water and adding 26.0 g of diethylene glycol. A second raw material solution was prepared by dissolving 5.56 g of iron(II) sulfate heptahydrate and 1 g of ascorbic acid in 12 g of pure water, adding 2.3 g of an aqueous phosphoric acid solution (85%) and then adding 17.3 g of diethylene glycol.

Two raw material solutions were heated up to 80° C. and flowed into channels of NanoVater L-ED in a ratio of first raw material solution:second raw material solution of 1.3:1 under a pressure of 10 MPa, and an active material particle for a lithium ion battery was obtained as the solid component from the solution after joining. Identification of crystal phase was performed according to B described above, and it could be confirmed that the obtained particle was $LiFePO_4$. In addition, the average particle diameter was calculated and found to be 61.1 nm, the crystallite size was 52.2 nm, and the crystallite size (nm)/average particle diameter (nm) was 0.85. The obtained lithium iron phosphate was mixed with glucose in a weight ratio of 4:1 and fired at 700° C. for 6 hours in an argon atmosphere, thereby applying a carbon coating to the lithium iron phosphate. The charge/discharge characteristics of the carbon-coated lithium iron phosphate obtained were evaluated according to C described above assuming a theoretical capacity of 170 mAh/g, as a result, the discharge capacity was 140 mAh/g at 0.1 C and 115 mAh/g at 3 C.

Example 3

Production of Lithium Manganese Phosphate:

An active material particle for a lithium ion battery was obtained in the same manner as in Example 2 except that 5.56 g of iron(II) sulfate heptahydrate was changed to 3.38 g of manganese sulfate monohydrate. Identification of crystal phase was performed, and it could be confirmed that the obtained particle was $LiMnPO_4$. In addition, the average particle diameter was calculated according to A. described above and found to be 433 nm, the crystallite size was 39.8 nm, and the crystallite size (nm)/average particle diameter (nm) was 0.92. The obtained lithium manganese phosphate was mixed with glucose in a weight ratio of 4:1 and fired at 700° C. for 6 hours in an argon atmosphere, thereby applying a carbon coating to the lithium manganese phosphate. The charge/discharge characteristics of the carbon-coated lithium manganese phosphate obtained were evaluated according to C described above assuming a theoretical capacity of 171 mAh/g, as a result, the discharge capacity was 136 mAh/g at 0.1 C and 102 mAh/g at 3 C.

Comparative Example 1

Production of $Li(Ni_{1/3}Mn_{1/3}Co_{1/3})O_2$:

While stirring the first raw material solution of Example 1 by a magnetic stirrer and keeping the pH at 8 by adding ammonia, the second raw material solution was added dropwise to obtain a $(Mn_{1/3}Ni_{1/3}Co_{1/3})CO_3$ particle as the solid component. The average particle diameter was calculated and found to be 384.5 nm and thus, the particle diameter became large. The obtained nanoparticle was mixed with 1.28 g of lithium hydroxide monohydrate and fired at 800° C. in an air atmosphere to obtain, as an active material particle for a lithium ion battery, $Li(Ni_{1/3}Mn_{1/3}Co_{1/3})O_2$ in which the particle diameter was enlarged providing an average particle diameter of 789.5 nm, a crystallite size of 531.9 nm, and a crystallite size (nm)/average particle diameter (nm) of 0.67 and the crystallinity was reduced. The charge/discharge characteristics of the obtained $Li(Ni_{1/3}Mn_{1/3}Co_{1/3})O_2$ were evaluated according to C described above assuming a theoretical capacity of 160 mAh/g, as a result, the discharge capacity was 133 mAh/g at 0.1 C and 124 mAh/g at 3 C.

Comparative Example 2

The first raw material solution of Example 2 was heated up to 80° C. while stirring at 300 rpm on a hot plate stirrer, and the second raw material solution of Example 2 heated up to 80° C. as well was added dropwise to obtain a solid component. When identification of the crystal phase of the solid obtained was performed, it was found that $Li_3PO_4$ was present in addition to $LiFePO_4$. Calculation of the average particle diameter was attempted, but because of a mixture of $LiFePO_4$ and the impurity, the particle diameter could not be measured.

Comparative Example 3

The first raw material solution of Example 3 was heated up to 80° C. while stirring at 300 rpm on a hot plate stirrer, and the second raw material solution of Example 3 heated up to 80° C. was added dropwise to obtain a solid. When identification of the crystal phase of the solid obtained was performed, it was found that impurities such as $Mn_5(HPO_4)_2(PO_4)_2 \cdot 4H_2O$ and $Li_3PO_4$ were present in addition to $LiMnPO_4$. Calculation of the average particle diameter was attempted according to A described above, but because of a mixture of $LiMnPO_4$ and the impurities, the particle diameter could not be measured.

The invention claimed is:

1. A method for producing an active material particle for a lithium ion battery, the method comprising steps of:
    flowing a plurality of raw material solutions into respective raw material-feeding channels under a pressure of 0.3 to 500 MPa, the solutions being capable of inducing a chemical reaction when mixed, thereby producing an active material particle of $LiMPO_4$, wherein M is one or more members selected from Fe, Co, Mn and Ni, for a lithium ion battery;
    wherein the plurality of raw material solutions is temperature-adjusted before mixing to a temperature from 60° C. to 120° C.; and
    mixing the plurality of raw material solutions at a junction of the raw material-feeding channels to induce the chemical reaction, thereby continuously producing the active material particle for a lithium ion battery.

2. The method for producing an active material particle for a lithium ion battery according to claim 1, wherein a channel diameter immediately before the junction of the raw material-feeding channels is from 0.05 to 3 mm.

3. The method for producing an active material particle for a lithium ion battery according to claim 1, wherein, near the junction of the raw material-feeding channels, a turbulent flow is imparted to the raw material solutions after joining.

4. The method for producing an active material particle for a lithium ion battery according to claim 1, wherein the chemical reaction includes a neutralization reaction.

5. The method for producing an active material particle for a lithium ion battery according to claim 1, wherein a solvent of the raw material solution is a coordinating solvent.

6. A method for producing a cathode active material particle for a lithium ion battery, wherein, in the method for producing an active material particle for a lithium ion battery according to claim 1, the plurality of raw material solutions includes a first raw material solution containing a lithium compound and a second raw material solution containing a transition metal.

* * * * *